United States Patent
Iijima et al.

(10) Patent No.: US 6,300,012 B1
(45) Date of Patent: Oct. 9, 2001

(54) ELECTRODE FOR NON-AQUEOUS ELECTROLYTIC CELLS

(75) Inventors: Tadayoshi Iijima; Shigeo Kurose, both of Saku; Tetsuya Takahashi, Nagano, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/424,238

(22) PCT Filed: May 27, 1998

(86) PCT No.: PCT/JP98/02314
§ 371 Date: Nov. 29, 1999
§ 102(e) Date: Nov. 29, 1999

(87) PCT Pub. No.: WO98/54771
PCT Pub. Date: Dec. 3, 1998

(30) Foreign Application Priority Data

May 27, 1997 (JP) .................................................. 9-136662

(51) Int. Cl.⁷ ...................................................... H01M 4/58
(52) U.S. Cl. ....................................... 429/231.8; 429/231.4; 429/212; 429/209
(58) Field of Search .............................. 429/231.4, 231.8, 429/218.1, 209, 212, 232

(56) References Cited

U.S. PATENT DOCUMENTS 5,478,671 * 12/1995 Idota ...................................... 429/194
5,654,114 * 8/1997 Kubota et al. ........................ 429/218
6,019,802 * 2/2000 Ishizuka et al. ..................... 29/623.5
6,037,095 * 3/2000 Miyasaka .......................... 430/218.1

* cited by examiner

Primary Examiner—Gabrielle Brouillette
Assistant Examiner—Raymond Alejandro
(74) Attorney, Agent, or Firm—Oblon, Spivak, McClelland, Maier & Neustadt, P.C.

(57) ABSTRACT

This invention is an electrode for a non-aqueous electrolytic cell, in which a collector is coated with an electrode active material layer comprising an active material, flake graphite and a binder, which is characterized by that the central particle size of the graphite is larger than that of the active material, and the following equation is satisfied, when the particle size of the active material is taken as r, the particle size distribution of the active material as f(r), the density of the active material as d, the specific surface area according to the BET method of the graphite as Sg, and the weight of the active material in an electrode coating film as Mg, and provides an electrode for a secondary cell which can give high capacity to the cell and enhance the flexibility of the cell:

$$\frac{9 \cdot Ma}{d} \int_0^\infty \frac{f(r)}{r} dr \leq Mg \cdot Sg$$

1 Claim, 3 Drawing Sheets

EXAMPLE 1 PARTICLE SIZE DISTRIBUTION (PARTICLE SIZE 4.2μm)

PARTICLE SIZE   x10⁻⁶ m

ELECTRODE FOR NON-AQUEOUS ELECTROLYTIC CELLS

TECHNICAL FIELD

The present invention relates to an electrode for a non-aqueous electrolytic cell, and an electrode for a non-aqueous electrolytic cell, in which a collector is coated with an electrode active material layer comprising an active material, flake graphite and a binder.

BACKGROUND ART

Of non-aqueous electrolytic cells high in discharge potential and discharge capacity, lithium ion secondary cells occluding and releasing lithium have recently come in practice. Electrodes of these cells are produced by preparing paints for active material layers using active materials and binders, applying the paints onto collectors, and drying them.

The active materials used in the electrodes are poor in electric conductivity, except for some materials, so that conductive materials are used. In the electrodes, the role of the conductive materials is important. If the conductive materials do not act effectively, the problem arises that the capacity of the cells is decreased, or that the cycle life is reduced.

In the lithium ion secondary cells, for example, when carbon is used as the active materials in negative electrodes, the introduction of lithium into the active materials expands them, and the release of lithium therefrom contracts them. In the lithium ion secondary cells, charge and discharge are repeated, which causes the active materials to repeat expansion and contraction. When the active materials are contracted, the contact of the active materials with the conductive materials becomes poor. The cells are therefore gradually deteriorated.

The non-aqueous electrolytic secondary cells include cells using carbon black such as acetylene black as the conductive materials, for example, "a non-aqueous electrolytic secondary cell having a negative electrode in which an alkali metal is used as an active material, non-aqueous electrolyte and a positive electrode, wherein a conductive material of said positive electrode comprises a large amount of metallic Ti powder and a small amount of carbon black" (Japanese Patent Unexamined Publication No. 62-15761), and cells using $LiMn_2O_4$ as the active materials and graphite as the conductive materials, for example, "a non-aqueous electrolytic secondary cell having a positive electrode mainly comprising $LiMn_2O_4$ and graphite, a negative electrode and non-aqueous electrolyte, wherein the ratio of graphite to the total amount of said $LiMn_2O_4$ and graphite is 8% to 22% by weight" (Japanese Patent Unexamined Publication No. 1-105459).

Further, methods for producing related electrodes for cells include, for example, "a method for producing a cell electrode comprising an insoluble, infusible substrate, a heat-treated product of a phenol resin, having a polyacene skeleton structure with a hydrogen/carbon atom number ratio of 0.5 to 0.05, and having a specific surface area value according to a BET method of at least 600 $m^2/g$, wherein powders of said insoluble, infusible substrate are mixed with a conductive material and a binder, and the resulting mixture is applied to press molding or coating or adhered under pressure onto a supports (Japanese Patent Unexamined Publication No. 63-301460).

When carbon black such as acetylene black is used as the conductive materials, as described in Japanese Patent Unexamined Publication No. 62-15761 mentioned above, the problems are encountered that the adhesion of a coating film to a collector is poor, resulting in easy separation, and that a coating film becomes too hard to obtain good flexibility, resulting in easy cracking of the electrode, because of large surface area of acetylene black.

When the graphite is used as the conductive material, as described in Japanese Patent Unexamined Publication No. 1-105459 mentioned above, the flexibility of a coating film is good, but the graphite having a small central particle size reduces the cycle life. On the other hand, the graphite having a large size is difficult to exhibit an effect as the conductive material, if it is not added in large amounts.

In the invention of Japanese Patent Unexamined Publication No. 63-301460, the particle size of the conductive material is decreased. However, the use of the graphite having a small particle size results in reduced cycle life.

In view of the problems as described above, the present invention provides an electrode for a non-aqueous electrolytic cell having good charge and discharge characteristics such as discharge capacity and charge and discharge cycle life, and improved in physical characteristics.

DISCLOSURE OF INVENTION

In order to solve the above-mentioned problems, the present inventors have conducted intensive investigation. As a result, the present inventors have discovered that the above-mentioned problems can be solved to achieve an object of the present invention by allowing the particle size, particle distribution, density and mass of an active material, and the specific surface area of graphite to satisfy a specified equation, in an electrode for a non-aqueous electrolytic cell, in which a collector is coated with an electrode active material layer comprising the active material, the flake graphite and a binder, thus completing the present invention.

That is to say, the present invention provides an electrode for a non-aqueous electrolytic cell, in which a collector is coated with an electrode active material layer comprising an active material, flake graphite and a binder, which is characterized by that the central particle size of said graphite is larger than that of said active material, and the following equation is satisfied, when the particle size of said active material is taken as r, the particle size distribution of said active material as f(r), the density of said active material as d, the specific surface area according to the BET method of said graphite as Sg, the weight of said active material in an electrode coating film as Ma, and the graphite of said graphite as Mg.

$$\frac{9 \cdot Ma}{d} \int_0^\infty \frac{f(r)}{r} dr \leq Mg \cdot Sg$$

The present invention will be described below in detail.

An object of the present invention is to provide an electrode for a non-aqueous electrolytic cell, which is improved in charge and discharge characteristics such as discharge capacity and charge and discharge cycle life, and in physical characteristics of a coating film.

In the electrodes for non-aqueous electrolytic cells, the active materials are poor in electric conductivity, except for some materials, so that conductive materials are used. In general, when the conductive materials are contained in larger amounts, the activity of the active materials is brought out more easily. However, the addition of the conductive materials in large amounts decreases the amounts of the active materials in the volumes of the electrodes, resulting in the decreased capacity of the cells. Efforts have therefore been made to decrease the amounts of the conductive materials while bringing out the activities of the active materials.

Further, the electrodes for non-aqueous electrolytic secondary cells are decreased in capacity to allow deterioration to occur each time they are used. As one of the causes of deterioration of the electrodes for non-aqueous electrolytic secondary cells, it is considered that the contact of the active materials with the conductive materials in the electrodes becomes poor to cause the failure to bring out electricity outside, resulting in deterioration as the cells. Usually, carbon black such as acetylene black or graphite is used as the conductive materials. Acetylene black has a large specific surface area. However, when the active materials are carbon, it has been conceivable that the contact of acetylene black with carbon is not so good.

In addition, the coating films using acetylene black is poor in adhesion thereof to the collectors, so that the problem is liable to occur that the coating films are easily separated, or that the coating films of the electrodes become hard to deteriorate the flexibility of the electrodes, which causes breakage of the electrodes in winding. Acetylene black tends to have a collected form, and therefore, the ratio of the area of the surface of acetylene black in contact with the active material to the whole surface area of acetylene black is not high for its large specific surface area. If the amount of acetylene black is decreased for improving the physical properties of the electrodes, the effect as the conductive materials is lowered.

Compared with the electrodes using acetylene black, the electrodes using graphite have good flexibility. Compared with acetylene black, the graphite is small in specific surface area. Accordingly, for making the contact surface of the graphite with the active materials as large as possible, the graphite having a small particle size or a large amount of graphite has been used. According to the description of the conductive material in Japanese Patent Unexamined Publication No. 63-301460 shown above, it is described that the smaller the particle size is, the more the effect is increased. As described above, however, the use of the graphite having a small particle size results in the reduced cycle life. The reason for this is considered to be that the connection among the conductive material particles is poor because of their small particle size.

Further, in Japanese Patent Unexamined Publication No. 1-105459, the non-aqueous electrolytic secondary cell using $LiMn_2O_4$ and graphite is described, and it is described that the amount of the graphite is preferably from 8% to 22% by weight, as shown above. This means that it is necessary to add the graphite in large amounts to some extent for producing the effect as the conductive material. This will be caused by that if the conductive material is not added in large amounts, the contact surface between the conductive material and the active material does not increase, because the specific surface area of the conductive material is small. The use of the conductive material having a relatively large particle size in large amounts gives an electrode having good cycle life. However, the amount of the active material contained in the volume of the electrode is decreased for that, so that the capacity as the cell is reduced.

The conductive material used in the present invention is the flake graphite. Such graphite is natural graphite or artificial graphite, and one showing flaky form. The flaky form in the present invention means the form of scaly, flaky, stratiform or mica-like thin layers laminated with one another. Specifically, although the form of natural graphite varies depending on production regions thereof, it may be adjusted so as to show the flaky form in the present invention by after-treatments such as pulverization and classification. Artificial graphite is preferably one showing the above-mentioned flaky form immediately after synthesis. However, similarly to natural graphite, it may be adjusted so as to show the flaky form in the present invention by after-treatments such as pulverization and classification. Of these graphite products, classified graphite is most preferred, because the flaky structure becomes uniform. Such graphite products showing the flaky form include LF series of Chuetsu Graphite Works Co., Ltd., UFG series of Showa Denko, KS series of LONZA, MICROCARBO-G series of Kansai Netsukagaku, Ecos Carbon series of Ecos Giken and naturally occurring flaky graphite or vein graphite.

The central particle size thereof is preferably from 1 to 100 $\mu$m, and more preferably from 4 to 50 $\mu$m.

The positive electrode active materials available in the present invention are lithium-containing metal oxides represented by the general formula of $Li_xM_yO_2$ (wherein M is a metal) or similar metal sulfides. $LiCoO_2$, $LiNi_xCo_{1-x}O_2$ and $LiMn_2O_4$ are preferred. The central particle size thereof is preferably from 1 to 30 $\mu$m, and more preferably from 7 to 20 $\mu$m.

The negative electrode active materials available in the present invention include amorphous carbon, petroleum coke, coal coke, vapor phase epitaxy carbon fiber, hard carbon, polymer carbon and tin oxides. In the present invention, however, hard carbon and polymer carbon which are high in hardness are preferred. Polymer carbon means a carbon material obtained by heat treating a polymer having a crosslinked structure in an inert atmosphere, and is obtained by carbonization of cellulose, a phenol resin, a furfural resin, polyparaphenylene or polyacrylonitrile. The central particle size of the negative electrode active material is preferably from 1 to 30 $\mu$m, and more preferably from 4 to 15 $\mu$m.

Graphite is cleavable, so that the cleavage of even graphite having a large particle size may cause an increase in specific surface area, but results in no substantial reduction in particle size. The central particle size of the graphite larger than that of the active material achieves the effect of the present invention. It is more preferred that the central particle size of the graphite is at least twice larger than that of the active material. The compounding amount of the conductive material is preferably from 0.1% to 15% by weight, and more preferably from 1% to 10% by weight, in the coating film, although it varies depending on the specific surface area of the active material and the like.

The active materials currently used are not the same in size of particles therein, and aggregates of particles different in size. The ratio of particles contained therein is different according to the particle size. The particle size distribution f(r) indicates the ratio of particles having a certain particle size to the whole. The particle size distribution f(r) is $$1=\int_0^\infty f(r)dr$$

and the ratio of particles having a particle size of $r_a$ to $r_b$ to the whole is $$\int_{r_a}^{r_b} f(r)dr$$

The particle size distribution is measured using a laser particle size distribution analyzer such as a Microtrack particle size analyzer manufactured by Nikkiso Co. Ltd. According to the laser particle size analyzer, the ratio of particles within the range previously determined to the whole can be measured for each range. For example, the division of the range of particle size is taken as $R_1, \ldots R_n, \ldots R_x$ in order from small one, and the ratio of particles having a particle size of $R_n$ to $R_{n+1}$ to the whole is considered to be measured as $P_n$.

Letting $r_n=(R_n+R_{n+1})/2$, the ratio is calculated as $$\int_0^\infty \frac{f(r)}{r} dr = \sum_{n=1}^{x-1} \frac{Pn}{rn}$$

For determining the following equation shown in the claim by actual measurement, the above-mentioned equation is used, provided that at least particles having a particle size of smaller than $R_1$ and particles having a particle size of larger than $R_x$ are not contained in this active material.

$$\int_0^\infty \frac{f(r)}{r} dr$$

Accordingly, the following equation is obtained.

$$\sum_{n=1}^{x-1} Pn = 1$$

The equation shown in the claim is as follows, with the proviso that calculation is made equalizing units.

$$\frac{9Ma}{d} \int_0^\infty \frac{f(r)}{r} dr = \frac{9Ma}{d} \sum_{n=1}^{x-1} \frac{Pn}{rn} \leq Mg \cdot Sg$$

The equation of the claim is derived as follows.

Now, considering a spherical material having a particle size of r, a particle size distribution of F(r) and a density of d, the specific surface area S thereof is as follows:

$$S = \frac{6}{d} \int_0^\infty \frac{F(r)}{r} dr$$

Usually, the conductivity between the active material and the conductive material takes place by contact of their respective surfaces. Then, the ratio of the surface of the active material to that of the conductive material is considered to be greatly related to cell characteristics. When the conductive material is flake graphite, the surface of the graphite is effectively used by mixing and pulverizing the graphite with the active material, as described below.

In the active material, primary particles are concentrated to form secondary particles, or the inside thereof has pores like hard carbon. Accordingly, the specific surface area measured is different, even when the particle size is the same. However, it is considered that a plane affecting the conductivity is an outer plane, and that an inner plane scarcely comes into contact with the conductive material.

Then, taking the particle size of the active material as r, the particle size distribution as f(r), and the density as d, the quantity of state Sa represented by the following equation is introduced.

$$Sa = \frac{6}{d} \int_0^\infty \frac{f(r)}{r} dr$$

The active material is pulverized to give a very complicated form, and is very seldom spherical. The quantity of state Sa is considered not to indicate the outside area of the active material, but to show a value proportional to the outside area even if the outside area varies with changes in the particle size distribution of the active material. Further, the surface area of the graphite in the coating film is the product of the specific surface area Sg of the graphite and the weight Mg of the graphite in the coating film (that is to say, Mg·Sg). Then, it was examined by experiments how the relationship between the quantity of state Sa and Mg·Sg affects the capacity and the cycle characteristic. From these experiments, the result was obtained that when the ratio of the surface area of the graphite in the coating film to the product-of the quantity of state Sa and the weight Ma of the active material in the coating film is 1.5 or more, that is to say, Sg·Mg/Sa·Ma≧1.5, the cycle characteristic is good. Thus, the following equation of the claim was derived.

$$\frac{9 \cdot Ma}{d} \int_0^\infty \frac{f(r)}{r} dr \leq Mg \cdot Sg$$

The central particle size is measured using a laser particle size analyzer such as a Microtrack particle size analyzer manufactured by Nikkiso Co. Ltd., and means the cumulative percent size in which the frequency cumulation is 50%.

When the electrode using the graphite is produced, there is a point to notice. The flake graphite is easily stacked, and if shearing force is carelessly given for loosening stacked one, the graphite is liable to be excessively stacked. For example, when it is tried to pulverize the graphite in a ball mill, the BET specific surface area is increased, but the graphite is still stacked.

In the stacked one, the plane thereof is not effectively utilized in respect to the contact with the active material. When pressure is applied to the stacked one, the planes adhere to each other to decrease the BET specific surface area.

The stacked graphite is mixed and pulverized using the active material, thereby making an effective plane in the graphite, which can come into contact with the active material. The mixing and pulverization include dry pulverization using an angmill manufactured by Hosokawa Micron Corp. and wet pulverization using a kneader.

In the mixing and pulverization of the flake graphite and the active material, the stacking of the flake graphite can be removed without disrupting the active material so much, because the flake graphite is low in hardness and has lubricity, and the active material is relatively high in hardness.

In lithium ion secondary cells, when graphite is used in negative electrodes, it acts as conductive materials and active materials, which is also advantageous in respect to capacity.

When the mixing and pulverization are carried out by a dry process, first, the ratio of the active material to the total amount of the conductive material comprising the flake graphite is established as high as possible, and both are compounded. Then, the resulting mixture is placed into an angmill or a jet mill, and impact force or shearing force is applied from the active material to the graphite to remove the stacking of the graphite and/or to pulverize it. Thereafter, lacking materials are added so as to give a desired final compounding ratio, followed by dispersion with a stirring mixer such as a hyper mixer, a dissolver or a sand grinder mill, if necessary, to finally adjust a paint for an active material layer of an electrode so as to meet the conditions of a coater.

The mixing ratio of the conductive material to the active material is from 0.1 to 40 parts by weight, and preferably from 2 to 15 parts by weight.

When the mixing and pulverization are carried out by a wet process, first, the ratio of the active material to the total amount of the conductive material comprising the flake graphite is established as high as possible, and both are compounded. A binder solution, a binder or a solvent is added thereto, followed by kneading with a kneader. Then, lacking materials are added so as to give a desired final compounding ratio, followed by dispersion with a stirring mixer such as a hyper mixer, a dissolver or a sand grinder mill, if necessary, to finally adjust a paint for an active material layer of an electrode so as to meet the conditions of a coater. When the kneader is used for the mixing and pulverization, it is necessary to compound materials in amounts corresponding to the kneading volume of the kneader used, and to sufficiently knead them. If the kneading operation is not conducted so as to form no space in the kneader, the pulverization of the graphite becomes insufficient, resulting in the difficulty of attaining the object of the present invention.

The above-mentioned kneader means an apparatus in which shear is given between a rotary blade called a kneader and a kneading tank. The form thereof may be either a batch treatment type or a continuous treatment type. Examples of the batch treatment type include open type kneaders and pressurization type kneaders. The open type is opened at an upper portion thereof, so that a space is formed. Accordingly, this type is unsuitable for attaining the object of the present invention. The pressurization type can establish a space to a minimum, so that it is possible to obtain the effect of the present invention most efficiently. Further, when the continuous treatment type kneader is used, a space is slightly developed, compared with the pressurization type, because it has a feed structure. However, this type is preferred because the process can be made continuous including pretreatment such as preliminary mixing, kneading, and after-treatment such as dilution and dissolution. Specific examples of the rotary blades of such kneaders include Σ, Z, cam, roller, S, fish tail and Banbury types. Specific examples of these kneaders include batch type kneaders such as MS type pressurization type kneaders of Moriyama Co., Ltd.; continuous kneaders such as KRC kneaders of Kurimoto, Ltd. and extruders of Fuji Powdernel, Kobe Seitetsusho and Toshiba Machine Co., Ltd.; and further, small-sized kneaders such as desk-top kneaders manufactured by Irie Shokai Co., Ltd., kneaders manufactured by Takabayashi Rika Co., Ltd., and Laboplast mills and Brabender kneaders of Toyo Seiki Co., Ltd. Further, other devices having functions similar to those of these kneaders include two-roll mills and Banbury mixers.

As the binders available in the present invention, thermoplastic resins or polymers having rubber elasticity can be used either alone or as a mixture thereof. Examples of the binders include fluorine polymers, polyvinyl alcohol, carboxymethyl cellulose, hydroxypropyl cellulose, regenerated cellulose, diacetyl cellulose, polyvinyl chloride, polyvinylpyrrolidone, polyethylene, polypropylene, EPDM, sulfonated EPDM, SBR, polybutadiene and polyethylene oxide. Of these, fluorine-containing polymers having a fluorine atom/carbon atom atomic ratio of 0.75 to 1.5, more preferably 0.75 to 1.3, are preferred. When this value is more than 1.5, the capacity of cells can not be sufficiently obtained. In the case of less than 0.75, the binders dissolve in electrolytic solutions. Such fluorine-containing polymers include polytetrafluoro-ethylene, polyvinylidene fluoride, vinylidene fluoride-ethylene trifluoride copolymers, ethylene-tetrafluoro-ethylene copolymers and propylene-tetrafluoroethylene copolymers. Further, fluorine-containing polymers in which hydrogen of main chains is substituted by alkyl groups can also be used. Of these, polymers indicating selective solubility (low in solubility in electrolytic solutions and having soluble solvents) are preferred. For example, in the case of vinylidene fluoride polymers, they are difficult to dissolve in carbonate solvents used as electrolytic solutions, but soluble in solvents such as N,N-dimethylformamide and N-methylpyrrolidone. The compounding amount of such a binder in the coating film is preferably from 2% to 20% by weight, and more preferably from 3% to 15% by weight, although it varies depending on the specific surface area and grain size of the active material and conductive material, and the desired strength of the electrode.

As the solvents for such paints for active material layers of the electrodes, ordinary organic solvents can be used, and specific examples thereof include organic solvents such as saturated hydrocarbons such as hexane, aromatic hydrocarbons such as toluene and xylene, alcohols such as methanol, ethanol, propanol and butanol, ketones such as acetone, methyl ethyl ketone, methyl isobutyl ketone and diisobutyl ketone, esters such as ethyl acetate and butyl acetate, ethers such as tetrahydrofuran, dioxane and diethyl ether, amides such as N,N-dimethylformamide, N-methylpyrrolidone and N,N-dimethylacetamide, and hydrocarbon halides such as ethylene chloride and chlorobenzene. Of these, amide solvents are preferred because they can dissolve the fluorine-containing polymers. These solvents can be used either alone or as a mixture of two or more of them.

Further, the collectors for such electrode active material compositions may be any, as long as they are electronic conductors which do not bring about chemical changes in cells constructed. For example, however, aluminum, copper, stainless steel, nickel, titanium and burned carbon can be used. Further, surfaces of these may be treated with carbon, nickel, titanium or silver. In particular, aluminum foil and copper foil are desirable, considering the resistance to oxidation, the flexibility of electrodes and the cost. These collectors are coated with the electrode active material composition paints by coating methods generally well known such as reverse roll methods, direct roll methods, blade methods, knife methods, extrusion methods, curtain methods, gravure roll methods, bar coat methods, dip methods, kiss coat methods and squeeze methods. Extrusion methods are preferred among others, and the good surface state of a coated layer can be obtained by selecting the solvent composition for the paint and the drying conditions so as to be coated at a speed of 5 to 100 m/minute. The thickness, length and width of the coated layer is determined by the size of a final cell. The thickness of the coated layer is preferably adjusted by press working generally employed after coating. The working pressure is preferably 0.2 to 10 t/cm, and the working temperature is preferably 10 to 150° C.

Figure 3:
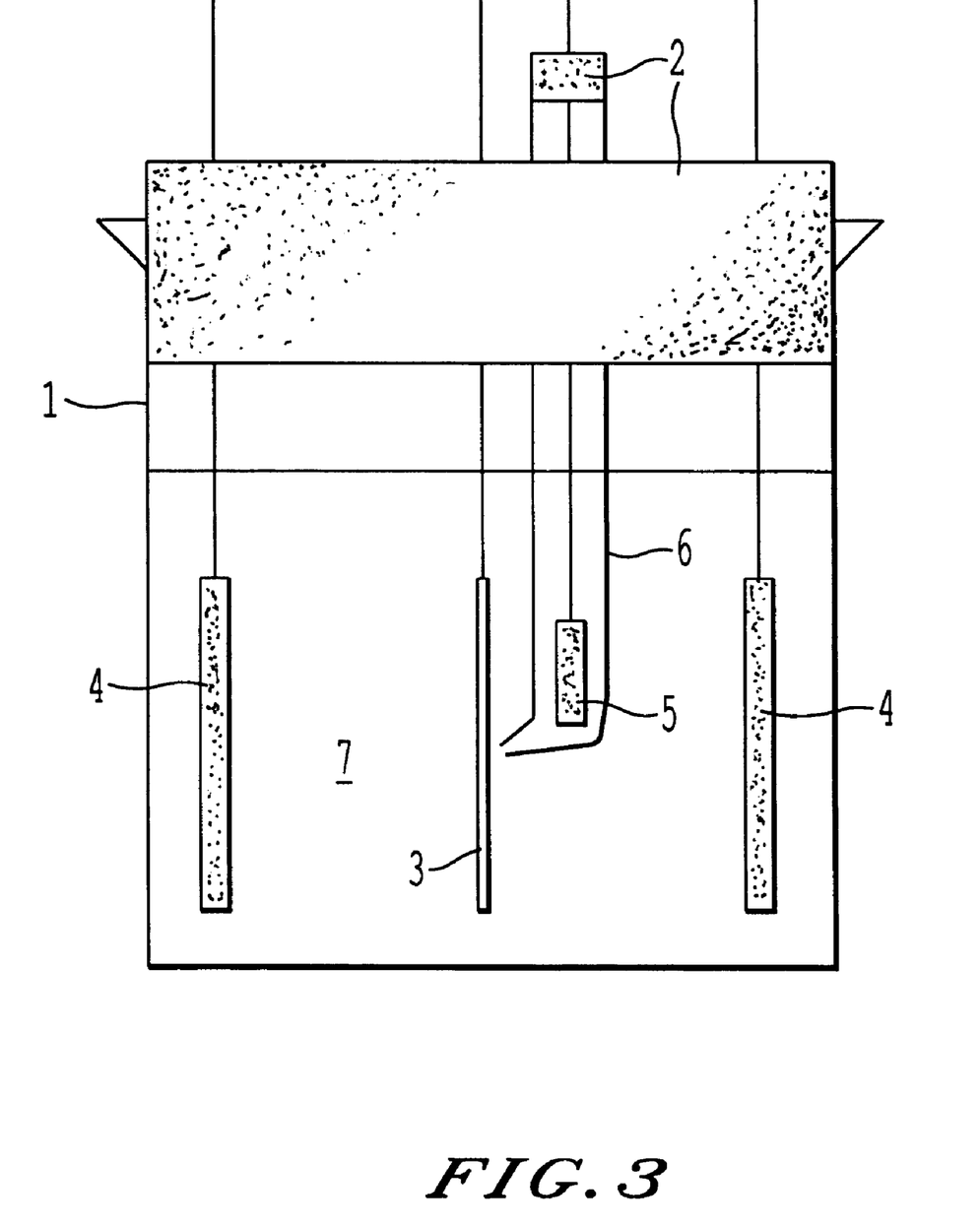
FIG. 3 is a cross sectional view showing a cell for measuring charge and discharge characteristics.

Reference characters in the figure show the following:

1 Beaker
2 Silicone stopper
3 Electrode (working electrode)
4 Counter electrodes
5 Reference electrode
6 Capillary
7 Electrolytic solution Best Mode for Carrying Out the Invention

EXAMPLE 1

Active material layers were prepared in the following manner.

Composition of Active Material Layer Paint

Active Material
Hard carbon: 80
Central particle size 4.2 μm
Conductive Material
Graphite KS75 manufactured by LONZA: 10
Binder
KYNAR741 manufactured by ELF-ATOCHEM Japan: 10
Polyvinylidene fluoride (PVDF)
Solvent
N-Methyl-2-pyrrolidone (NMP): 150
The unit is parts by weight.

The left side of the following equation was 136.

$$\frac{9 \cdot Ma}{d} \int_0^\infty \frac{f(r)}{r} dr \leq Mg \cdot Sg$$

Figure 1:
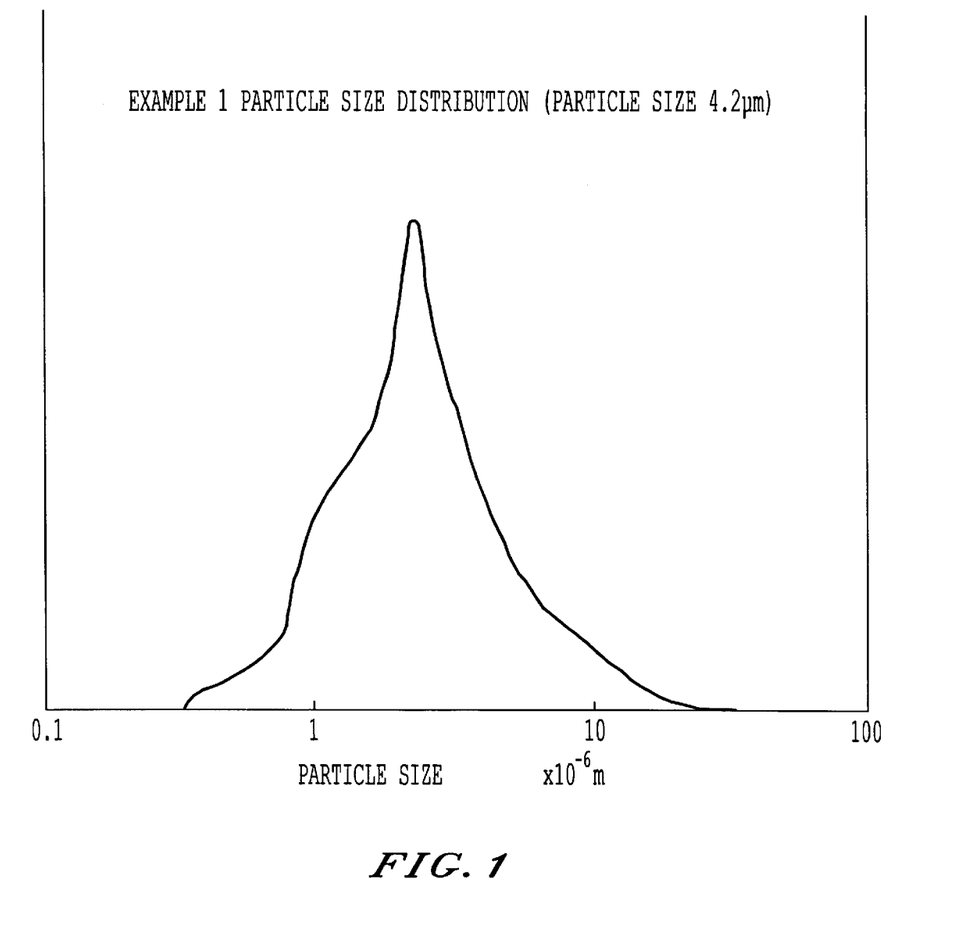
FIG. 1 is a graph showing the particle size distribution in Example 1.

This was calculated based on the following date. Further, the particle size distribution is shown in FIG. 1.

TABLE 1

| n | Particle Size rn (m) ×10⁻⁶ | Ratio Pn ×10⁻² | Pn/rn ×10⁴ |
|---|---|---|---|
| 1 | 0.3 | 0 | 0 |
| 2 | 0.4 | 0.1 | 0.25 |
| 3 | 0.5 | 0.14 | 0.28 |
| 4 | 0.6 | 0.29 | 0.4833333 |
| 5 | 0.8 | 0.57 | 0.7125 |
| 6 | 0.9 | 1.03 | 1.1444444 |
| 7 | 1.1 | 2.02 | 1.8363636 |
| 8 | 1.3 | 3.16 | 2.4307692 |
| 9 | 1.6 | 3.61 | 2.25625 |
| 10 | 1.9 | 5 | 2.6315789 |
| 11 | 2.2 | 6.91 | 3.1409091 |
| 12 | 2.5 | 7.86 | 3.144 |
| 13 | 3 | 8.15 | 2.7166667 |
| 14 | 3.6 | 8.21 | 2.2805556 |
| 15 | 4.3 | 7.17 | 1.6674419 |
| 16 | 5.1 | 6.61 | 1.2960784 |
| 17 | 6 | 6.03 | 1.005 |
| 18 | 7.2 | 5.74 | 0.7972222 |
| 19 | 8.5 | 5.6 | 0.6588235 |
| 20 | 10 | 5.47 | 0.547 |
| 21 | 12 | 4.71 | 0.3925 |
| 22 | 14 | 3.74 | 0.2671429 |
| 23 | 17 | 2.73 | 0.1605882 |
| 24 | 20 | 1.72 | 0.086 |

TABLE 1-continued

| n | Particle Size rn (m) ×10⁻⁶ | Ratio Pn ×10⁻² | Pn/rn ×10⁴ |
|---|---|---|---|
| 25 | 24 | 1.29 | 0.05375 |
| 26 | 29 | 0.86 | 0.0296552 |
| 27 | 34 | 0.57 | 0.0167647 |
| 28 | 40 | 0.31 | 0.00775 |
| 29 | 48 | 0.28 | 0.0058333 |
| 30 | 57 | 0.12 | 0.0021053 |
| 31 | 68 | 0 | 0 |

$$\int_0^\infty \frac{f(r)}{r} dr = \sum_{\frac{d}{Ma}} Pn/rn$$

$30.3 \times 10^4 \, m^{-1}$
$1.6 \times 10^6 \, g/m^3$
80

In 150 parts by weight of NMP, 10 parts by weight of PVDF was dissolved to prepare 160 parts by weight of a binder solution. The conductive material was pulverized with a jet mill to prepare one having a central particle size of 18 μm, and then, pulverized for 7 hours with a ball mill using zirconia beads as a medium to obtain one having a BET specific surface area of 19 m²/g. Then, 80 parts by weight of the active material and 10 parts of the conductive material pulverized were placed into an angmill, and mixed and pulverized for 20 minutes. To this mixture, the above-mentioned binder solution was added, and mixed by a hyper mixer to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 1.

EXAMPLE 2

An active material layer paint was prepared in the same manner as with Example 1 with the exception that a conductive material was used in which the conductive material of Example 1 was pulverized with a jet mill to prepare one having a central particle size of 12 μm, which was pulverized with a ball mill for 5 hours to a BET specific surface area of 20 m²/g.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 2.

EXAMPLE 3

An active material layer paint was prepared in the same manner as with Example 1 with the exception that a conductive material was used in which the conductive material of Example 1 was pulverized with a jet mill to prepare one having a central particle size of 12 μm, which was pulverized with a ball mill for 2 hours to a BET specific surface area of 14 m²/g.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 3.

EXAMPLE 4

An active material layer paint was prepared in the same manner as with Example 1 with the exception that a conductive material was used in which the conductive material of Example 1 was changed to natural flake graphite (LF-18A manufactured by Chuetsu Graphite Works Co., Ltd., having a central particle size of 18 µm), which was pulverized with a ball mill for 9 hours to a BET specific surface area of 20 m$^2$/g.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 4.

Comparative Example 1

An active material layer paint was prepared in the same manner as with Example 1 with the exception that a conductive material was used in which the conductive material of Example 1 was pulverized with a jet mill to prepare one having a central particle size of 18 µm, which was then pulverized with a ball mill using zirconia beads as a medium for 3 hours to a BET specific surface area of 12 m$^2$/g.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 1.

Comparative Example 2

An active material layer paint was prepared in the same manner as with Example 1 with the exception that a conductive material was used in which the conductive material of Example 1 was pulverized with a jet mill to prepare one having a central particle size of 12 µm, which had a BET specific surface area of 10 m$^2$/g.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 2.

Comparative Example 3

An active material layer paint was prepared in the same manner as with Example 1 with the exception that a conductive material was used in which the conductive material of Example 1 was pulverized with a jet mill to prepare one having a central particle size of 3.5 µm, which was pulverized with a ball mill for 30 minutes to a BET specific surface area of 20 m$^2$/g.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 3.

Comparative Example 4

The conductive material of Example 1 was changed to acetylene black (Denka Black manufactured by Denki Kagaku Kogyo), and 80 parts by weight of the active material and 10 parts by weight of acetylene black were placed into an angmill, followed by mixing and pulverization for 20 minutes. The binder solution was added thereto, followed by mixing by a hyper mixer to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 4.

Comparative Example 5

The conductive material of Example 1 was changed to vapor growth carbon fiber (VGCF manufactured by Showa Denko), and 80 parts by weight of the active material and 10 parts by weight of the vapor growth carbon fiber were placed into an angmill, followed by mixing and pulverization for 20 minutes. The binder solution was added thereto, followed by mixing by a hyper mixer to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 5.

EXAMPLE 5

Active material layers were prepared in the following manner.
Composition of Active Material Layer Paint
  Active Material
  Hard carbon: 88
  Central particle size 12 µm
  Conductive Material
  Graphite KS75 manufactured by LONZA: 5
  Binder
  KYNAR741 manufactured by ELF-ATOCHEM Japan: 7
  Polyvinylidene fluoride (PVDF)
  Solvent
  N-Methyl-2-pyrrolidone (NMP): 150
  The unit is parts by weight.

$$\frac{9 \cdot Ma}{d} \int_0^\infty \frac{f(r)}{r} dr \leq Mg \cdot Sg$$

Figure 2:
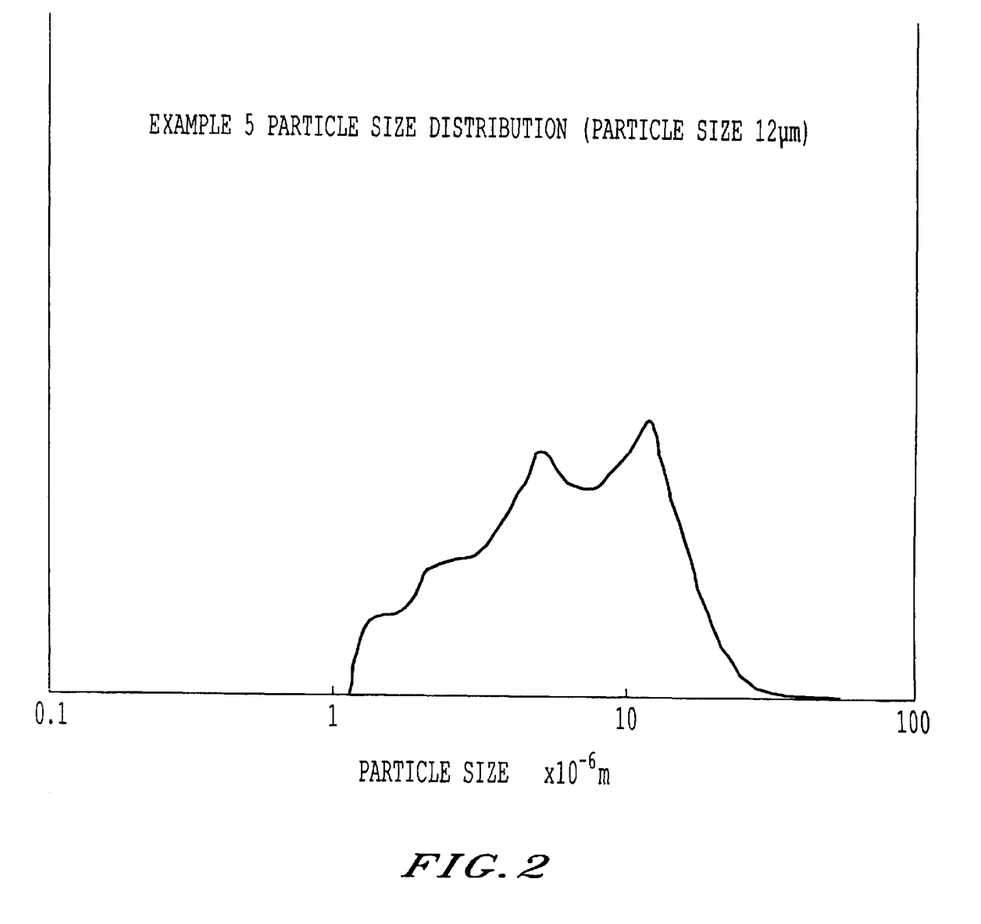
FIG. 2 is a graph showing the particle size distribution in Example 5.

When calculations were made in the same manner as with Example 1, the left side of the above-mentioned equation was 60. The particle size distribution is shown in FIG. 2.

In 150 parts by weight of NMP, 7 parts by weight of PVDF was dissolved to prepare 157 parts by weight of a binder solution. The conductive material was pulverized with a jet mill to prepare one having a central particle size of 18 µm, and then, pulverized for 7 hours with a ball mill using zirconia beads as a medium to obtain one having a BET specific surface area of 19 m$^2$/g. Then, 88 parts by weight of the active material and 5 parts of the conductive material pulverized were placed into an angmill, and mixed and pulverized for 20 minutes. To this mixture, the above-mentioned binder solution was added, and mixed by a hyper mixer to obtain an active material layer paint.

The paint thus prepared was applied onto one side of a collector of rolled copper foil with a blade coater, and dried.

Then, the same paint was applied onto the reverse side thereof, and dried, followed by compression molding with a roller press and cutting to a specified size to obtain an electrode of Example 5.

EXAMPLE 6

Active material layers were prepared in the following manner.
(Composition of Active Material Layer Paint)
Active Material
Hard carbon: 89
Central particle size 12 μm
Conductive Material
Graphite KS75 manufactured by LONZA: 4
Binder
KYNAR741 manufactured by ELF-ATOCHEM Japan: 7
Polyvinylidene fluoride (PVDF)
Solvent
N-Methyl-2-pyrrolidone (NMP): 150
The unit is parts by weight.

$$\frac{9 \cdot Ma}{d} \int_0^\infty \frac{f(r)}{r} dr \leq Mg \cdot Sg$$

When calculations were made in the same manner as with Example 1, the left side of the above-mentioned equation was 61.

In 150 parts by weight of NMP, 7 parts by weight of PVDF was dissolved to prepare 157 parts by weight of a binder solution. The conductive material was pulverized with a jet mill to prepare one having a central particle size of 18 μm, and then, pulverized for 7 hours with a ball mill using zirconia beads as a medium to obtain one having a BET specific surface area of 19 m²/g. Then, 89 parts by weight of the active material and 4 parts of the conductive material pulverized were placed into an angmill, and mixed and pulverized for 20 minutes. To this mixture, the above-mentioned binder solution was added, and mixed by a hyper mixer to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 6.

Comparative Example 6

Active material layers were prepared in the following manner.
(Composition of Active Material Layer Paint)
Active Material
Hard carbon: 90
Central particle size 12 μm
Conductive Material Graphite KS75 manufactured by LONZA: 3
Binder
KYNAR741 manufactured by ELF-ATOCHEM Japan: 7
Polyvinylidene fluoride (PVDF)
Solvent
N-Methyl-2-pyrrolidone (NMP): 150
The unit is parts by weight.

$$\frac{9 \cdot Ma}{d} \int_0^\infty \frac{f(r)}{r} dr \leq Mg \cdot Sg$$

When calculations were made in the same manner as with Example 1, the left side of the above-mentioned equation was 61.

In 150 parts by weight of NMP, 7 parts by weight of PVDF was dissolved to prepare 157 parts by weight of a binder solution. The conductive material was pulverized with a jet mill to prepare one having a central particle size of 18 μm, and then, pulverized for 7 hours with a ball mill using zirconia beads as a medium to obtain one having a BET specific surface area of 19 m²/g. Then, 90 parts by weight of the active material and 3 parts of the conductive material pulverized were placed into an angmill, and mixed and pulverized for 20 minutes. To this mixture, the above-mentioned binder solution was added, and mixed by a hyper mixer to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 6.

Comparative Example 7

Active material layers were prepared in the following manner.
(Composition of Active Material Layer Paint)
Active Material
Hard carbon: 91
Central particle size 12 μm
Conductive Material
Graphite KS75 manufactured by LONZA: 2
Binder
KYNAR741 manufactured by ELF-ATOCHEM Japan: 7
Polyvinylidene fluoride (PVDF)
Solvent
N-Methyl-2-pyrrolidone (NMP): 150
The unit is parts by weight.

$$\frac{9 \cdot Ma}{d} \int_0^\infty \frac{f(r)}{r} dr \leq Mg \cdot Sg$$

When calculations were made in the same manner as with Example 5, the left side of the above-mentioned equation was 62.

In 150 parts by weight of NMP, 7 parts by weight of PVDF was dissolved to prepare 157 parts by weight of a binder solution. The conductive material was pulverized with a jet mill to prepare one having a central particle size of 18 μm, and then, pulverized for 7 hours with a ball mill using zirconia beads as a medium to obtain one having a BET specific surface area of 19 m²/g. Then, 91 parts by weight of the active material and 2 parts of the conductive material pulverized were placed into an angmill, and mixed and pulverized for 20 minutes. To this mixture, the above-mentioned binder solution was added, and mixed by a hyper mixer to obtain an active material layer paint.

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 7.

Evaluation Method (Electrode Characteristics)

Each of the samples of Examples 1 to 6 and Comparative Examples 1 to 7 was cut to a size 25 mm in length and 20 mm in width, and the electrode layer was removed in a length of 5 mm at an upper end portion to leave the electrode layer 20 mm square. A stainless steel wire was spot welded as a lead to the upper end portion from which the electrode layer was removed, thereby preparing an electrode (working electrode).

As shown in FIG. 3, a cell for measuring charge and discharge capacity was prepared to conduct charge and discharge as follows.

A pair of counter electrodes 4 using lithium plates each of which is connected to a stainless steel wire and a capillary 6 having a similar reference electrode 5 were arranged in a beaker 1, and the electrode (working electrode) 3 prepared above was further arranged between the counter electrodes. As an electrolytic solution 7, a solution obtained by dissolving 1 mol/liter of lithium perchlorate as an electrolytic salt in a mixed solvent of ethylene carbonate and diethyl carbonate of a volume ratio of 1:1 was used. Each of the beaker and the capillary was sealed with a silicone stopper. Thus, the cell for measurement was prepared.

Then, charge and discharge were repeated 5 times to this cell at a constant current of 2 mA within the range of 0 V to 2 V (potential vs Li/Li$^+$). The first capacity in releasing Li ions was measured, and taken as the initial capacity. Further, the fifth capacity was also measured, and taken as the charge and discharge cycle characteristic.

TABLE 2

| | Mg · Sq | Conductive Material | Initial Capacity (mAh/g) | 5Th Capacity (mAh/g) |
|---|---|---|---|---|
| Example 1 | 190 | Graphite | 394 | 365 |
| Example 2 | 200 | Graphite | 387 | 342 |
| Example 3 | 140 | Graphite | 375 | 333 |
| Example 4 | 200 | Graphite | 396 | 366 |
| Comparative Example 1 | 120 | Graphite | 370 | 317 |
| Comparative Example 2 | 100 | Graphite | 371 | 278 |
| Comparative Example 3 | 200 | Graphite | 368 | 270 |
| Comparative Example 4 | 600 | Denka Black | 352 | 198 |
| Comparative Example 5 | 130 | VGCF | 364 | 220 |

TABLE 3

| | Mg · Sg | Ma | Z | Initial Capacity (mAh/g) | 5Th Capacity (mAh/g) |
|---|---|---|---|---|---|
| Example 5 | 95 | 88 | 60 | 396 | 390 |
| Example 6 | 76 | 89 | 61 | 397 | 388 |
| Comparative Example 6 | 57 | 90 | 61 | 388 | 325 |
| Comparative Example 7 | 36 | 91 | 62 | 377 | 263 |

$$Z: \frac{9Ma}{d} \int_0^\infty \frac{f(r)}{r} dr$$

$$d = 6 \times 10^6 \text{ g/m}^3$$

$$\int_0^\infty \frac{f(r)}{r} dr = 12.1 \times 10^4$$

As is known from Tables 2 and 3, the graphite having a central particle size of larger than that of the active materials and a large surface area brings out the characteristics of the active materials. In the graphite having the same surface area, the good results are obtained at a ratio of 1.5 or more. The capacity of the electrodes prepared is also increased, and the cycle characteristic suggesting the life of secondary cells is also improved.

Industrial Applicability

The electrodes for non-aqueous electrolytic cells of the present invention are good in the charge and discharge characteristics such as the discharge capacity and the charge and discharge cycle life, and improved in physical characteristics. They are therefore very effectively utilized in the field in which the electrodes for non-aqueous electrolytic cells are employed.

What is claimed is:

1. An electrode for a non-aqueous electrolytic cell, in which a collector is coated with an electrode active material layer comprising an active material, flake graphite and a binder, wherein the central particle size of said graphite is larger than that of said active material, and the following equation is satisfied, when the particle size of said active material is taken as r, the particle size distribution of said active material as f(r), the density of said active material as d, the specific surface area according to the BET method of said graphite as Sg, and the weight of said active material in an electrode coating film as Ma, and the weight of said graphite as Mg:

$$\frac{9 \cdot Ma}{d} \int_0^\infty \frac{f(r)}{r} dr \le Mg \cdot Sg.$$

* * * * *